United States Patent [19]

Allen

[11] Patent Number: 5,550,786
[45] Date of Patent: Aug. 27, 1996

[54] HIGH FIDELITY VIBRATORY SOURCE SEISMIC METHOD

[75] Inventor: Kenneth P. Allen, Dallas, Tex.

[73] Assignee: Mobil Oil Corporation, Fairfax, Va.

[21] Appl. No.: 435,940

[22] Filed: May 5, 1995

[51] Int. Cl.$^6$ ................................ G01V 1/24; G01V 1/36
[52] U.S. Cl. ................................ 367/48; 367/23; 364/421
[58] Field of Search ................................ 367/13, 23, 43, 367/48, 190; 364/421; 381/97; 181/106, 112

[56] References Cited

U.S. PATENT DOCUMENTS

| | | | |
|---|---|---|---|
| 4,346,461 | 8/1982 | Muir | 367/100 |
| 4,601,022 | 7/1986 | Muir | 367/14 |
| 4,607,353 | 8/1986 | Muir | 367/39 |
| 4,862,423 | 8/1989 | Rector | 367/25 |
| 5,134,590 | 7/1992 | Garatta | 364/421 |
| 5,325,436 | 6/1994 | Soli et al. | 381/97 |

OTHER PUBLICATIONS

Silvia, M. F., Northeastern University, PhD Thesis, 302 page, 1977; Tulsa AN 254596; abst. only herewith.
Carlini et al, 52nd BA BG Mfg., Jun. 1990, First Break, vol. 9, #10, pp. 458–466; abst. only herewith.

*Primary Examiner*—Nelson Moskowitz
*Attorney, Agent, or Firm*—Ronald A. Bleeker; Malcolm D. Keen; Dennis P. Santini

[57] ABSTRACT

A method for recording and pre-processing high fidelity vibratory seismic data includes measuring the motion of the vibrator which is related to the vibrator applied force times a transfer function of minimum phase, causal, linear system relating the actual vibrator output with the measured vibrator motion, determining a ratio by dividing the vibratory seismic data by the measured motion of the vibrator to remove the unknown applied force leaving the earth reflectivity times a time derivative divided by a minimum phase function, minimum phase band pass filtering the resulting ratio and performing minimum phase deconvolution to remove the time derivative divided by the transfer function of minimum phase. The method may also include the steps of receiver ensemble deconvolution, statics correction, F-K filtering for noise, zero phase spiking deconvolution and model dephasing. The actual signal that the vibrator is sending into the ground is used in pre-processing. The vibrator motion is measured to provide a signal that is used to process the data. The data is divided by the actual measured motion in the frequency domain.

12 Claims, 2 Drawing Sheets

HIGH FIDELITY VIBRATORY SOURCE SEISMIC METHOD

BACKGROUND OF THE INVENTION

1. Field of the Invention

The present invention pertains to seismic data processing and more particularly to pre-processing seismic data in which data generated by a vibrating source is received and prepared for high resolution or high fidelity data processing.

2. Related Prior Art

It is conventional practice to use a vibratory source to apply a force to the ground and measure the subsequent motion caused by the application of this force at various receiver locations. By controlling the duration and frequency of the force a broad band signal with sufficient energy is achieved. By using the receiver motions and assumed force application a seismogram is constructed (typically by correlation with an estimate of the applied force) from which properties of the impedance function of the earth can be calculated.

The main deficiency of conventional practice is that an estimate of the actual applied force is used to create the seismogram. Much work has been done in order to improve the quality of feedback signals and the operation of feedback loops and hydraulic valves. However, harmonics, device flexure and variable ground coupling remain as unknowns in the system.

In conventional processing, data that is generated by a vibratory source is correlated with a reference sweep. A reference sweep signal is an ideal signal which the vibrator is told to put into the ground, which is often quite different from the actual signal which is generated. The typical estimate for the applied force is the mass weighted sum of the acceleration of the baseplate used in the vibrating source and the acceleration of the reaction mass used in the vibrator structure, called the ground force.

Traditionally, a reference sweep is created and fed into an actuator. The actuator vibrates and attempts to put a ground force identical to the reference sweep signal into the ground. Usually there are two accelerometers on the vibrator, one on the baseplate and one on the reaction mass used with the vibrator structure. Conventional techniques assume that the vibrator earth model has a base plate that is stiff, although it is known that there is a lot of flexing in the base plate. This can inject inaccuracies in processing methods since prior art methods, based on allowing the base plate to flex, are approximations.

The mass weighted sum of the two signals, one from the baseplate and one from its reaction mass, is used in a feedback loop to tell the actuator how close it is to the reference sweep. With this system it is assumed that the force injected into the ground is the same as the reference sweep. However, as stated previously, the actual signal is often very different from the reference sweep signal.

The force put into the ground can be viewed either in the time domain or in the frequency domain. Similarly, the impulse response of the earth can be viewed either in the time domain or the frequency domain. The time derivative of the force put into the ground is convolved with the impulse response of the earth in the time domain while the time derivative of the force is multiplied by the impulse response of the earth in the frequency domain. In its most basic form, a signal representing the derivative of the ground force convolved with the impulse response of the earth is detected by geophones or receivers located on the surface of the earth. It is detected after it has been reflected by an interface existing between two subsurface layers having different impedances. The detected signal is correlated with the reference sweep signal fed to the actuator. This correlation works fine to compress the force portion of the detected signal in a known way as long as the force put into the ground is the same as the reference sweep signal. Since it is rarely the same, an accurate estimate of the impulse response of the earth is seldom achieved.

Correlation in the frequency domain requires that the data be multiplied by the time reverse of whatever signal with which the correlation is being done. Since the reference is only an estimate of the actual ground force, the result is that an unknown is still in the data. In the case of correlation of the signal with the reference, the unknown does less damage to the result as long as the amplitude and phase errors of the reference signal are small, but it still adds error.

SUMMARY OF THE INVENTION

The present invention provides a method for recording and pre-processing high resolution vibratory source data for both land and marine environments which includes measuring the motion or motions of the vibrator which are related to the actual vibrator applied force by a transfer function of a minimum phase, causal, linear system. This system relates the actual vibrator output with the measured vibrator motion or motions. A ratio is determined by dividing the vibratory seismic data by the measured motion or motions of the vibrator to remove the unknown applied force leaving the earth reflectivity times a time derivative divided by a minimum phase function. Minimum phase deconvolution is performed to remove the time derivative divided by the transfer function of minimum phase. The method may also include the steps of, receiver ensemble deconvolution, statics correction, F-K filtering for noise, zero phase spiking deconvolution and model dephasing. In the present invention, a signal directly related to the actual signal that the vibrator is sending into the ground is used in pre-processing. The vibrator motion or motions are measured to provide a signal that is used to process the data. Thus, the data is not correlated with a theoretical sweep signal but the data is divided by a minimum phase relative of the actual transmitted signal in the frequency domain, which removes the actual transmitted signal from the determination. When solving for the earth reflectivity, data is basically divided by the vibrator ground force multiplied by a transfer function of minimum phase, removing the vibrator force from the data. This leaves the earth reflectivity multiplied by a time derivative divided by a minimum phase transfer function, which ratio is then removed by minimum phase deconvolution.

DESCRIPTION OF THE PREFERRED EMBODIMENT

In gathering seismic data in a land based environment using ground vibrations, a large mass is placed in contact with the ground. Similar configurations for generating subsurface vibrations are used in a marine environment with design modifications necessitated by an underwater environment. However, only land vibratory sources are described for simplicity.

A simple vibrator may be used for land based environments in the present invention. Typically a force is applied by reversing hydraulic flow in a chamber in a reaction mass that is suspended by a piston and rod assembly attached to a stilt structure at a cross member.

Typically, the reaction mass motion is measured by a pair of accelerometers mounted on the reaction mass itself. The motion of a baseplate, which is actually coupled to the ground, is measured by a pair of accelerometers mounted on the stilt structure cross member. In the present invention, pairs of accelerometers are used so that the outputs may be compared and a determination may be made whether the signal generated is suitable for use in further processing.

Figure 1:
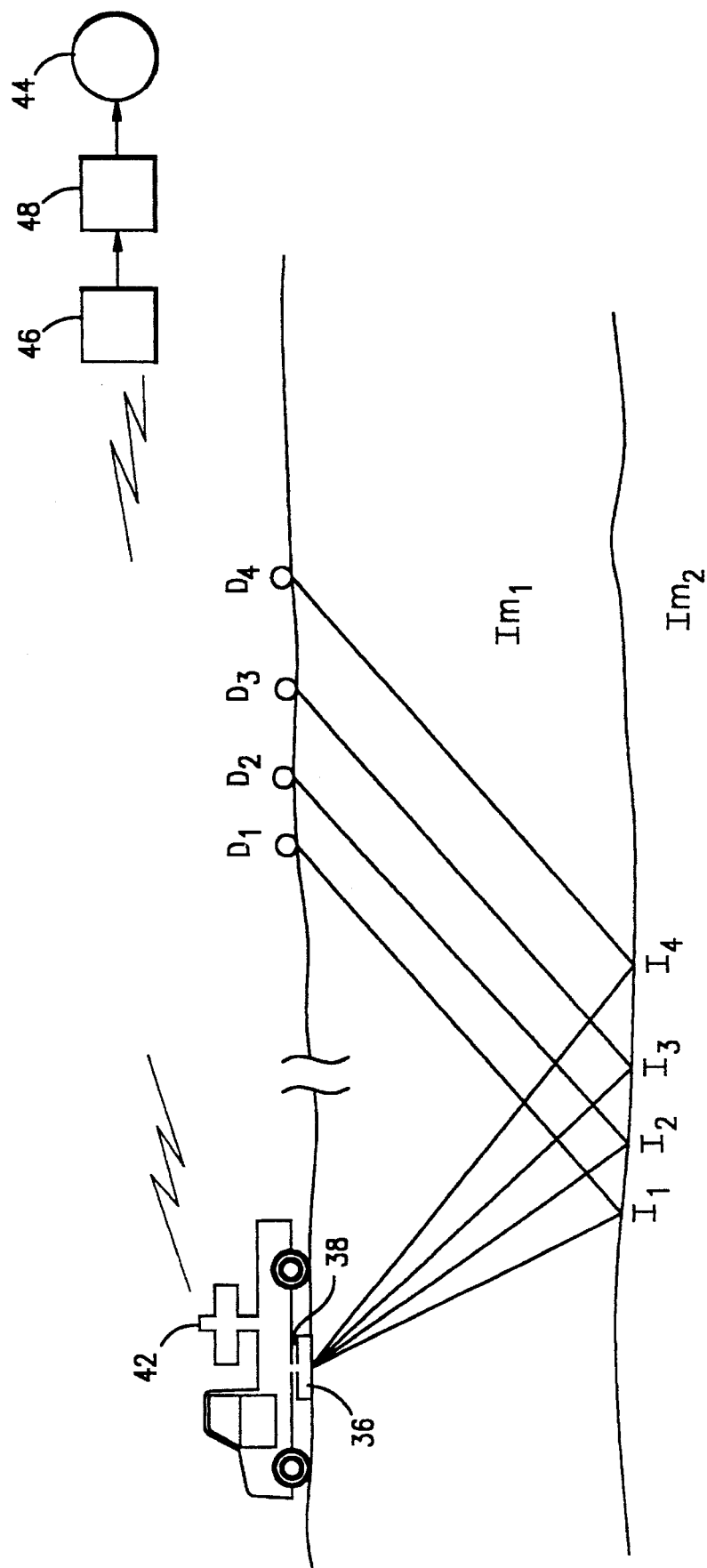
FIG. 1 is a drawing of a typical seismic data gathering technique.

FIG. 1 is a system diagram illustrating the data gathering process of the present invention. Vibrator 36 with accelerometers 38, as described above, that measure the actual signal that is generated into the earth are located on truck 40. The signals are then transmitted via radio link 42 to master vibrator memory 44 where they are checked to determine their reliability and are stored for comparison at a later time.

The signal that is generated into the earth by vibrator 36 is reflected off the interface between subsurface impedance $Im_1$ and $Im_2$ at points $I_1$, $I_2$, $I_3$ and $I_4$. This reflected signal is detected by geophones $D_1$, $D_2$, $D_3$ and $D_4$, respectively. The signals generated by vibrator 36 on truck 40 are transmitted to recorder 46 for transfer to tape 48 for combination with raw seismic data received from geophones $D_1$, $D_2$, $D_3$ and $D_4$. The received data signals and the raw seismic data stored on a tape 48 can be transferred to computers at other locations.

The measured signals are representative of the actual signals that are generated into the surface of the earth through vibratory source technique. These measured signals are minimum phase relatives of the actual signals that are generated into the surface of the earth by this technique. In prior art applications, most processing is done with the signal which is intended to be generated into the surface of the earth as a reference sweep signal. In the present invention, a signal which is minimum phase related to the actual force generated into the surface of the earth is measured and taken from the vibrator source directly. Thus, an actual signal is used in the process instead of a theoretical signal.

Using the method of the present invention, High Fidelity Vibratory Seismic, HFVS, recording vibratory motion and processing the recorded seismic data is done in such a way that the unknown actual applied force does not need to be known. The only important factor is that the measured quantity is directly proportional to the actual force applied. In this manner, the actual force can be eliminated by division.

In conventional processing a reference signal x is fed to an actuator which attempts to put a signal, the true vibrator output, into the ground. As this signal travels through the earth, its time derivative is multiplied by the impulse response of the earth in the frequency domain or convolved with the impulse response in the time domain. It is this convolution product:

$$\frac{dg}{dt} \otimes e$$

where
g=the true vibrator output in the time domain, e=the impulse response of the earth in the time domain, and $\otimes$=convolution in the time domain that is correlated with x, the reference sweep signal or:

$$\frac{dg}{dt} \otimes e \oplus x$$

where
x=the reference sweep signal, and
$e \oplus$=correlation in the time domain
This process is correct if and only if:

$$x=g$$

The present invention takes a different approach by first recognizing that the motions measured on the vibrator are related to the actual output force or signal that is put into the ground by a minimum phase transfer function in the frequency domain. The output force signal is multiplied by a transfer function of minimum phase:

$$U=G \cdot T$$

where:
U=the measured motion on the vibrator
G=the true vibrator output in the frequency domain,
T=a transfer function of a minimum phase, causal, linear system relating G with measured vibrator motion, and
·=multiplication in the frequency domain.

In this equation both the minimum phase transfer function, T, and the actual output force, G, are unknown.

The seismic data detected by either geophones or hydrophones is represented in the frequency domain by the convolution of the time derivative of the actual force G with the reflectivity of the earth, E, as indicated by the following formula:

$$D=j\omega \cdot G \cdot E$$

where:
D=the measured seismic data
$j\omega$=the time derivative
E=the earth reflectivity By using inverse filtering through a minimum phase band pass filter the ratio of D/U can be computed. This ratio eliminates the unknown G, the output force, from the equation as follows:

$$\frac{D}{U} = \frac{j\omega \cdot G \cdot E}{G \cdot T} = \frac{j\omega}{T} \cdot E$$

At this point, the unknown force G has been eliminated from the equation. A scaling factor is also required to preserve total energy through the inverse filtering process.

The seismogram is now represented by D/U and is the desired answer E, convolved with a minimum phase function $j\omega/T$. It is a property of minimum phase functions that their derivative and their reciprocal are also minimum phase. The seismogram can be further processed with minimum phase deconvolution to obtain E, the impulse response of the earth in the frequency domain. In essence the D/U seismogram is the band limited impulse seismogram. It is causal and minimum phase related to the earth response.

$$D/U \rightarrow \text{MINIMUM PHASE DECONVOLUTION} \rightarrow E$$

This method is always correct since the actual and unknown vibratory motion has been eliminated.

Figure 2:
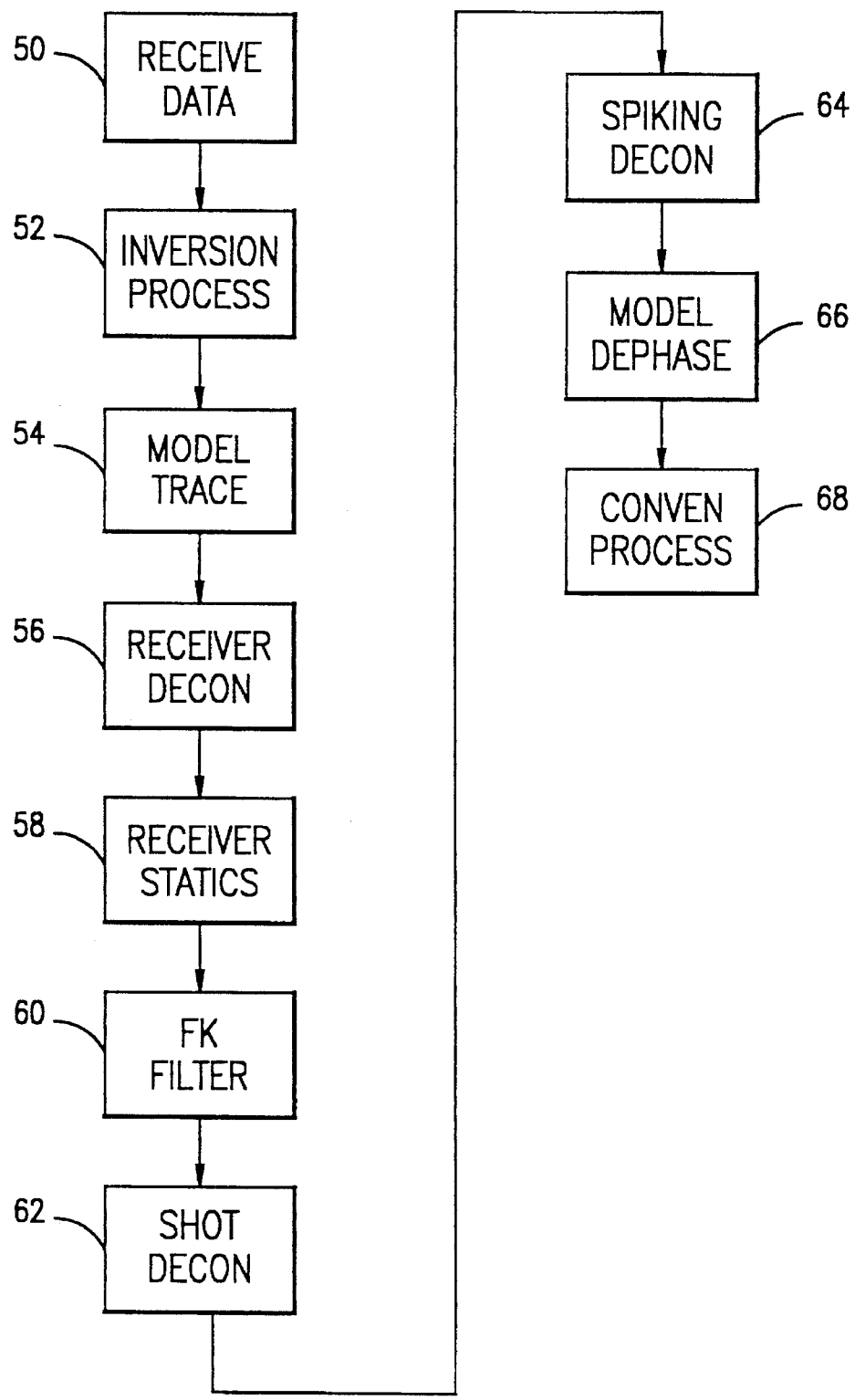
FIG. 2 is a block diagram of a flow chart illustrating a pre-processing method for data generated by a single source.

Referring now to FIG. 2 a flow chart of the method of present invention is illustrated in block form. This method may be performed on any digital computer or work station currently in use in the art.

Initially, data stored on tape 48 is received at block 50. Data received may be of any type of seismic data generated using vibratory source techniques. At block 52, a division process is performed on the received data with the measured signals. This represents a significant difference between the present invention and conventional processing. In conventional processing, the received data is correlated with signals that are assumed to be generated into the earth's surface. In the present invention, a division process is used which eliminates certain assumptions which previously have been made regarding the vibrator force injected into the ground.

At block 54 a model trace is generated. This model trace is basically a trace with a spike to record the phase and amplitude of the original data. This generated model trace will be used later to remove any phase errors that may have been introduced in the pre-processing process of the present invention.

At block 56 receiver deconvolution is performed on the results of the division process from block 54. In the preferred embodiment, this receiver deconvolution is of a common receiver gather format. A Wiener-Levinson spiking ensemble deconvolution is used in the present invention, however, any deconvolution which uses a common receiver gather format to remove the effects due to variations between individual receivers may be used.

At block 58, receiver statics correction is performed on the data. In the preferred embodiment a constant source location gather to remove receiver statics, (i.e. intra group statics).

At block 60 F-K filtering is performed using a constant source location variable receiver gather is used to remove ground roll. In the preferred embodiment, the same gather for statics correction and for FK filtering is used, a constant source location.

At block 62 shot deconvolution is performed on the data which has been statics corrected. This deconvolution is also a Wiener-Levinson spiking ensemble deconvolution type. However, as with the receiver deconvolution performed previously, any deconvolution that is of a common shot gather type to remove shot noise is acceptable.

At block 64 zero phase spiking deconvolution is performed on the data which has been subjected to the receiver and shot deconvolutions and the statics correction. This deconvolution is a spectral whitening deconvolution to reduce monochromatic noise.

At block 66 model dephasing is done. In this dephasing process, the model trace which was generated at block 54 to record the original phase and amplitude is used to remove any phase errors that may have been introduced by the previous processing steps. At block 68 conventional processing may be performed.

Thus, the method of the present invention for recording and pre-processing high resolution vibratory source data has been described which includes the steps of division with measured signals, receiver and shot ensemble deconvolution, statics correction, F-K filtering for noise, zero phase spiking deconvolution and model dephasing. As stated previously, an actual vibrator signal related to what the vibrator is sending into the ground is used in pre-processing. The vibrator motion is measured to provide a signal that is used to process the data. The data is divided by the actual transmitted signal in the frequency domain.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A method for recording high resolution vibratory source data comprising the steps of:

receiving electrical signals representing detected seismic information generated by a vibratory source;

receiving measured signals representing transmitted seismic waves from said vibratory source;

dividing said electrical signals with said measured signal to obtain earth reflectivity multiplied by a time derivative divided by a minimum phase transfer function to obtain a minimum phase data set;

filtering said minimum phase data set with a minimum phase band pass filter;

performing minimum phase deconvolution on said minimum phase data set to obtain data representing earth reflectivity; and recording said data representing earth reflectivity.

2. The method according to claim 1 also including the steps of:

performing receiver deconvolution on said minimum phase data set;

performing statics correction on said minimum phase data set;

processing said statics corrected minimum phase data set;

performing shot deconvolution on said processed minimum phase data set; and performing zero phase spiking deconvolution on said shot deconvolved minimum phase data set.

3. The method according to claim 2 wherein said processing step includes the step of:

performing FK filtering on said minimum phase data set.

4. The method according to claim 2 wherein said processing step includes the step of:

performing array forming on said minimum phase data set.

5. The method according to claim 2 also including the steps of:

generating a model trace with of said minimum phase band pass filtered minimum phase data set;

dephasing said zero phase spiking deconvolved minimum phase data set with said model trace.

6. The method according to claim 1 wherein said receiving measured signals step includes the steps of:

measuring the signal of the motion of the vibrator transmitting a force into the earth's surface; and converting said measured motion signals into a measured electrical signal.

7. An apparatus for recording high resolution vibratory source data comprising:

means for receiving electrical signals representing received seismic information;

means for receiving measured signals representing a force generated into the ground;

means for dividing said electrical signals with said measured signals to obtain earth reflectivity multiplied by a time derivative divided by a minimum phase transfer function signals;

means for deconvolving said earth reflectivity multiplied by a time derivative divided by a minimum phase transfer function signals;

correction means for performing statics correction on said deconvolved earth reflectivity multiplied by a time derivative divided by a minimum phase transfer function signals;

FK filtering means for said statics corrected earth reflectivity multiplied by a time derivative divided by a minimum phase transfer function signals;

array forming means for said filtered statics corrected earth reflectivity multiplied by a time derivative divided by a minimum phase transfer function signals;

recording means for said summed earth reflectivity multiplied by a time derivative divided by a minimum phase transfer function signals; and display means for displaying said recorded summed earth reflectivity multiplied by a time derivative divided by a minimum phase transfer function signals.

8. The apparatus according to claim 7 wherein said filtering means includes:

means for performing FK filtering.

9. The apparatus according to claim 8 wherein said means for receiving measured signals includes:

means for measuring a signal related to a ground force actually transmitted into the earth's surface; and means for converting said measured ground force signals into a measured electrical signal.

10. A method for recording and pre-processing data generated by a vibrator including the steps of:

obtaining data generated by a vibrator, said data representing a vibrator output multiplied by earth reflectivity;

measuring a motion signal representing vibrator output in the frequency domain;

determining a ratio of said data representing a vibrator output multiplied by earth reflectivity and said measured motion signal to remove the unknown applied force leaving data representing said earth reflectivity times a time derivative divided by a transfer function of minimum phase;

performing minimum phase deconvolution to remove the time derivative divided by the transfer function of minimum phase and to obtain data representing said earth reflectivity; and recording said data representing earth reflectivity.

11. The method according to claim 10 wherein said obtaining data step includes the steps of:

receiving said data representing a vibrator output multiplied by earth reflectivity in the time domain; and converting said data representing a vibrator output multiplied by earth reflectivity from the time domain into the frequency domain.

12. The method according to claim 10 also includes the steps of:

converting said data representing said earth reflectivity from the frequency domain to the time domain.

* * * * *